(12) United States Patent
Takao et al.

(10) Patent No.: US 9,009,604 B2
(45) Date of Patent: Apr. 14, 2015

(54) DISPLAY PROCESSING DEVICE, DISPLAY INFORMATION DISTRIBUTION DEVICE, AND DISPLAY PROCESSING METHOD

(71) Applicant: Kabushiki Kaisha Toshiba, Tokyo (JP)

(72) Inventors: Yuji Takao, Akishima (JP); Mieko Onodera, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/057,880

(22) Filed: Oct. 18, 2013

(65) Prior Publication Data

US 2014/0046964 A1 Feb. 13, 2014

Related U.S. Application Data

(63) Continuation of application No. 12/897,495, filed on Oct. 4, 2010, now abandoned.

(30) Foreign Application Priority Data

Oct. 29, 2009 (JP) .................. 2009-248832

(51) Int. Cl.
*G06F 17/30* (2006.01)
*G06Q 30/02* (2012.01)
(Continued)

(52) U.S. Cl.
CPC .......... *G06F 17/30038* (2013.01); *G06Q 30/02* (2013.01); *H04N 5/44543* (2013.01);
(Continued)

(58) Field of Classification Search
CPC ................................. G06F 17/30038
USPC ........................ 715/753, 810, 719
See application file for complete search history.

(56) References Cited

U.S. PATENT DOCUMENTS

2009/0080698 A1 * 3/2009 Mihara et al. .................. 382/103
2009/0307003 A1 12/2009 Benyamin et al.
2011/0107237 A1 5/2011 Takao et al.

FOREIGN PATENT DOCUMENTS

JP 2007272651 10/2007
JP 2008305312 12/2008
(Continued)

OTHER PUBLICATIONS

U.S. Appl. No. 12/897,495, Non Final Office Action, mailed Jan. 7, 2013.
(Continued)

*Primary Examiner* — Andrea Leggett
(74) *Attorney, Agent, or Firm* — Blakely, Sokoloff, Taylor & Zafman LLP

(57) ABSTRACT

According to one embodiment, a display processing apparatus includes an obtaining module, a relevance calculator, a display information generator, and a display controller. The obtaining module is configured to obtain particular information items allowed to be created by users, the particular information being obtained for each of a key content item and other content items. The relevance calculator is configured to calculate one or more relevances between the key content item and each of the other content items, based on the particular information items. The display information generator is configured to generate display information items expressing the key content item and the other content items, based on the particular information items or content-attribute information items peculiar to the key content item and the other content items. The display controller is configured to control to display a list information item in which the display information items are located at predetermined positions.

10 Claims, 9 Drawing Sheets

(51) Int. Cl.
*H04N 5/445* (2011.01)
*H04N 21/45* (2011.01)
*H04N 21/462* (2011.01)
*H04N 21/466* (2011.01)
*H04N 21/475* (2011.01)
*H04N 21/482* (2011.01)
*H04N 21/84* (2011.01)
*H04N 21/47* (2011.01)

(52) U.S. Cl.
CPC ....... *H04N 21/4532* (2013.01); *H04N 21/4622* (2013.01); *H04N 21/466* (2013.01); *H04N 21/47* (2013.01); *H04N 21/475* (2013.01); *H04N 21/4828* (2013.01); *H04N 21/84* (2013.01)

(56) References Cited

FOREIGN PATENT DOCUMENTS

JP 2009223372 1/2009
JP 2009080580 4/2009

OTHER PUBLICATIONS

U.S. Appl. No. 12/897,495, Non Final Office Action, mailed Jun. 20, 2012.
U.S. Appl. No. 12/897,495, Non Final Office Action, mailed Sep. 8, 2011.
U.S. Appl. No. 12/897,495, Final Office Action, mailed Jul. 23, 2013.
U.S. Appl. No. 12/897,495, Final Office Action, mailed Jan. 18, 2012.
Japanese Patent Application No. 2009-248832; Notice of Reasons for Rejection; Mailed Dec. 14, 2010 (English Translation).

\* cited by examiner

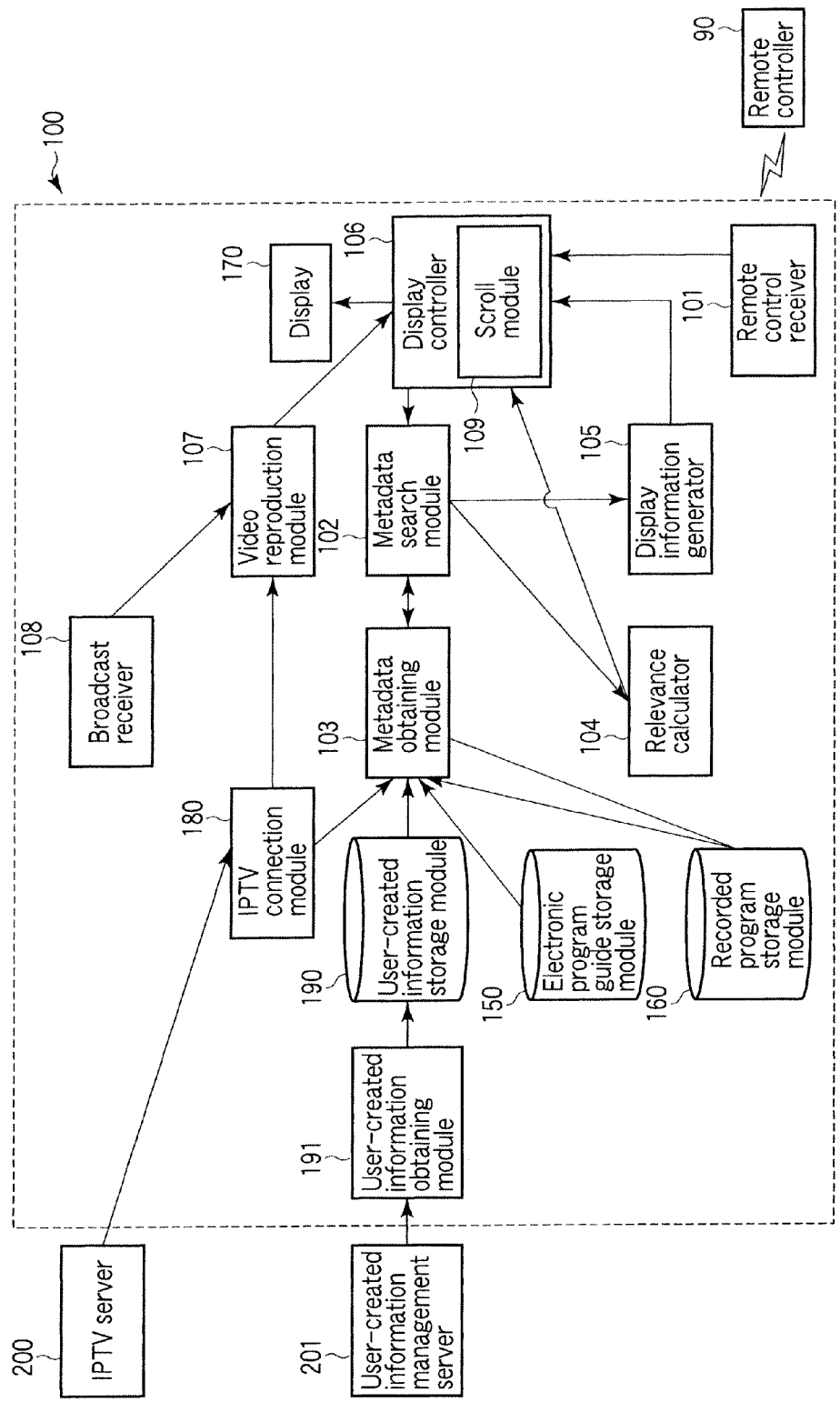
F I G. 1

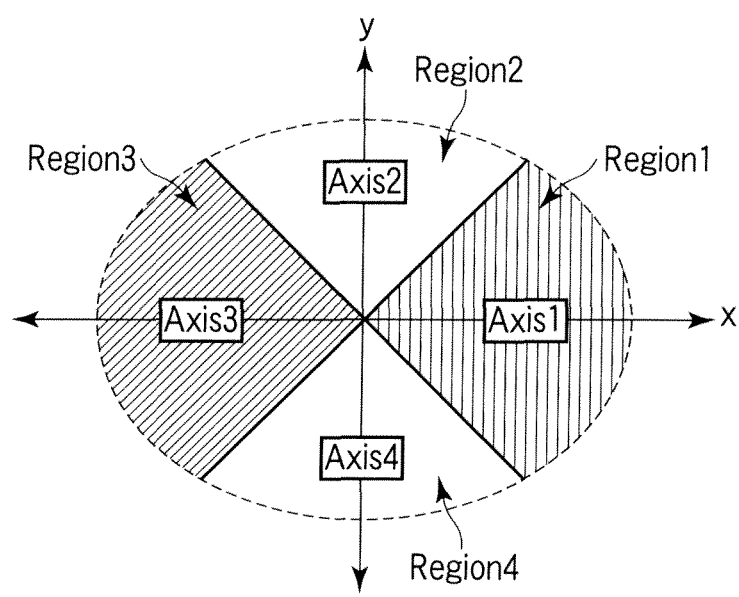
F I G. 4

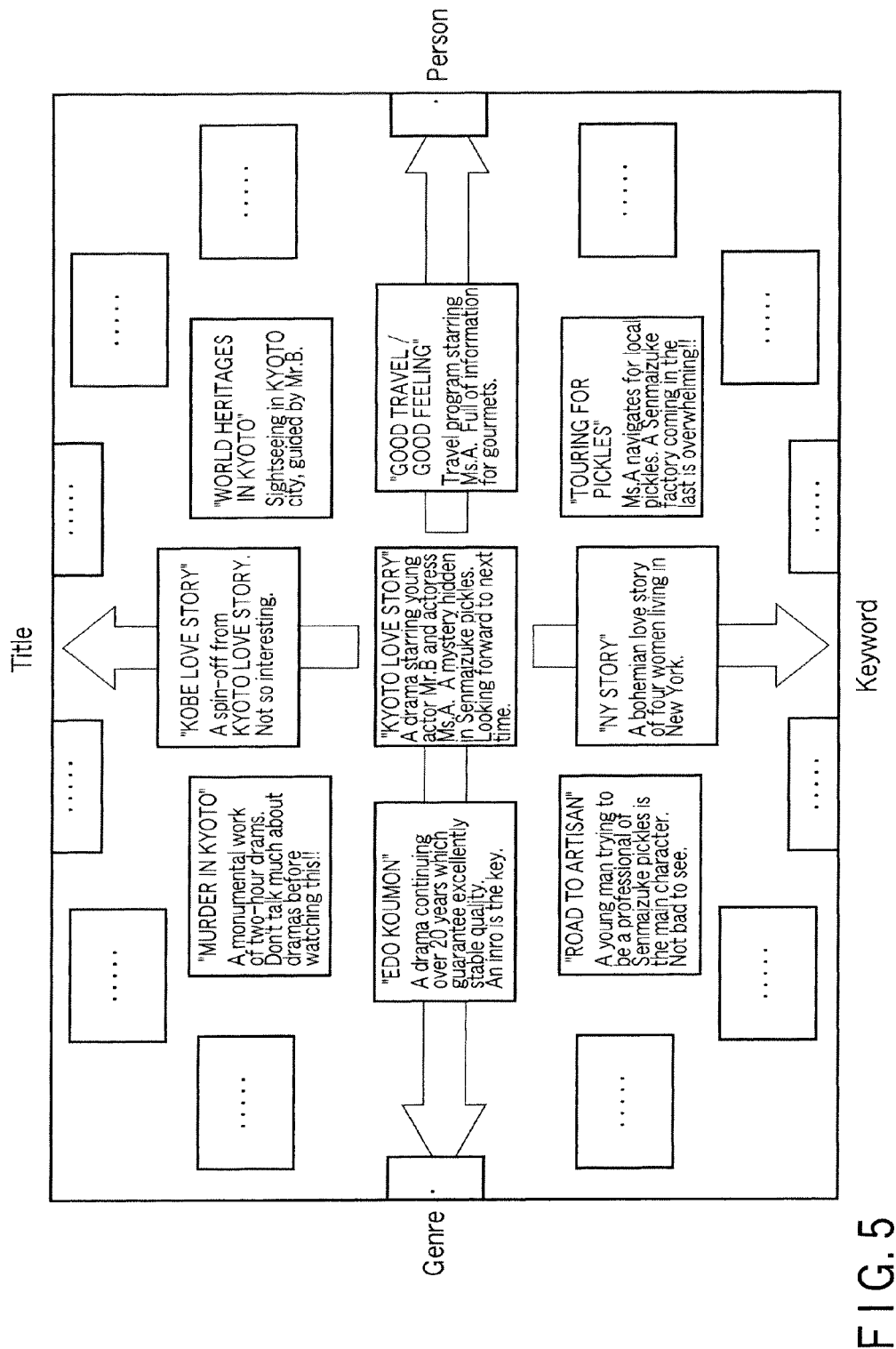
F I G. 5

| | User-created information list of program 1 |
|---|---|
| No.1 | • Have you seen clothes of Mr. B in "Program 1"? He is always fashionable, isn't he. He looked good in the jacket particularly in the beginning of the program.<br>Yoko 2008/11/20 00:30 |
| No.2 | • I check dramas starring Ms. A every time! The character in "program 1" suites her. That phrase was cool!<br>Keiko 2008/11/20 10:00 |
| No.3 | • The "program 1" in this week was very suspenseful. From beginning to end, I could not guess an offender. Detective dramas are good after all Detective dramas remind me of....<br>Akira 2008/11/21 09:00 |
| No.4 | • I'm always looking forward to it, and "program 1" today was especially good because Mr. B played quite great. His action is extreme.<br>Mika 2008/11/20 21:00 |
| No.5 | • This time, Ms. A appeared in less scenes. She appeared only shortly in an ending part. I'd been always looking forward to "program 1" but felt disappointed<br>Hitomi 2008/11/20 20:30 |
| No.6 | • Dramas in this time band look likely to be boring. Today, I stopped watching "program 1" halfway.<br>Takashi 2008/11/20 20:00 |

F I G. 8

F I G. 10

| | User-created information list of program 1 |
|---|---|
| No.1 | • Have you seen clothes of Mr. B in "Program 1"? He is always fashionable, isn't he. He looked good in the jacket particularly in the beginning of the program.<br>Yoko 2008/11/20 00:30 |
| No.2 | • I check dramas starring Ms. A every time! The character in "program 1" suites her. That phrase was cool!<br>Keiko 2008/11/20 10:00 |
| No.3 | • The "program 1" in this week was very suspenseful. From beginning to end, I could not guess an offender. Detective dramas are good after all. Detective dramas remind me of....<br>Akira 2008/11/21 09:00 |
| No.4 | • I'm always looking forward to it, and "program 1" today was especially good because Mr. B played quite great. His action is extreme.<br>Mika 2008/11/20 21:00 |

DISPLAY PROCESSING DEVICE, DISPLAY INFORMATION DISTRIBUTION DEVICE, AND DISPLAY PROCESSING METHOD

CROSS-REFERENCE TO RELATED APPLICATIONS

This application is a continuation of U.S. patent application Ser. No. 12/897,495, filed Oct. 4, 2010, which is based upon and claims the benefit of priority from Japanese Patent Application No. 2009-248832, filed Oct. 29, 2009; the entire contents of both of which are incorporated herein by reference.

FIELD

Embodiments described herein relate generally to a display processing device, a display information distribution device, and a display processing method which generate a display screen.

BACKGROUND

In recent years, there is a rapid increase in number of content items which are accessible from users, owing to enhancing content-storage capability of audiovisual (AV) devices, seamlessness not limited within a device but between devices, or seamlessness between content items existing in networks.

Users are therefore required to obtain a desired content item from a huge amount of content items. In such a case, a user obtains a desired content item on the basis of a keyword such as a title.

Jpn. Pat. Appln. KOKAI Publication No. 2009-80580 discloses a video display device which displays visualized content items positioned at intervals varied depending on relevancies in a virtual space, based on similarity between properties of a selected content item as a processing target and properties of other content items than the selected content item.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram representing a configuration of a display processing device according to an embodiment.

FIG. 4 is an exemplary display screen view for describing display of display information items.

FIG. 5 is an exemplary display screen view illustrating an example of display positions of user-created information items.

FIG. 8 is an exemplary display screen illustrating another display example of content display information items.

FIG. 10 is an exemplary display screen illustrating another display example of content display information items.

DETAILED DESCRIPTION

Figure 2:
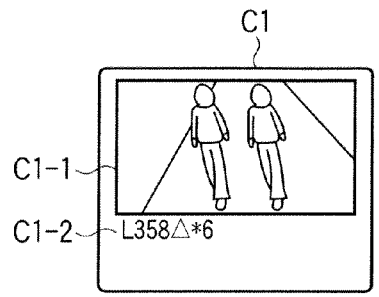
FIG. 2 is an exemplary view illustrating an example of a metadata item when a TV program is a content item.

Various embodiments will be described hereinafter with reference to the accompanying drawings.

In general, according to one embodiment, a display processing apparatus includes an operation receiver, an obtaining module, a relevance calculator, a display information generator, and a display controller. The operation receiver is configured to receive a selection operation for selecting a key content item to become a search key. The obtaining module is configured to obtain particular information items allowed to be created by users, the particular information being obtained for each of the key content item and other content items. The relevance calculator is configured to calculate one or more relevances between the key content item and each of the other content items, based on the particular information items. The display information generator is configured to generate display information items expressing the key content item and the other content items, based on the particular information items or content-attribute information items peculiar to the key content item and the other content items. The display controller is configured to control to display a list information item in which the display information items are located at predetermined positions, based on the relevances.

Hereinafter, an embodiment of a display processing device will be described in details below with reference to the drawings. The embodiment below cites an example of applying the display processing device to a television set (TV). However, the invention is not limited to the embodiment but is applicable to any display device insofar as the display device can display videos. Schematically in the display processing device according to the embodiment, if a user searches plural content items for a key content item to become a search key and content items relevant to the key content item, the display processing device displays the plural content items relevant to the selected key content item, together with the selected content item.

A functional configuration of a display processing device 100 will be described. FIG. 1 is a block diagram representing a configuration of the display device 100 according to the embodiment. As represented in FIG. 1, the display processing device comprises a display 170, a broadcast receiver 108, a video reproduction module 107, and an internet-protocol-television (IPTV) connection module 180, and is connected to an IPTV server 200 through a network. The display processing device 100 also comprises a processor, such as an application-specific integrated circuit (ASIC) or a central processing unit (CPU), and storage devices such as a read only memory (ROM) and a random access memory (RAM). The read only memory (ROM) stores a predetermined program to control operations of the display processing device 100, and the random access memory (RAM) serves as a work area for the processing device (though neither ROM nor RAM is represented in the figure). The processing device and programs in the storage devices cooperate together to constitute functional parts, such as an electronic program guide storage module 150, a recorded program storage module 160, a remote control receiver 101, a metadata search module 102, a metadata obtaining module 103, a relevance calculator 104, a display information generator 105, a display controller 106, and the video reproduction module 107.

The IPTV server 200 is a server which distributes videos such as TV programs and cinemas by using the IP. Upon a request from the display processing device 100, the IPTV server 200 distributes a content item of a corresponding video, and a metadata of the content item. The IPTV connection module 180 is an interface which connects the display processing device 100 to the IPTV server 200.

The electronic program guide storage module 150 is a storage medium, such as a hard disk drive (HDD) or a memory, to store electronic program guides obtained from an external server which manages/distributes electronic program guides (EPGs). Specifically, the electronic program guide storage module 150 obtains electronic program guides for television (TV), cable television (CATV), communication satellite (CS) broadcast, etc., from server devices of service providers connected to a network, such as the Internet. The electronic program guide storage module 150 stores obtained electronic program guides. The electronic program guides contain information concerning programs to be broadcasted from now up to a time point in the future (for example, one week from now).

The recorded program storage module 160 is a storage medium, such as a HDD or a memory, which stores content items such as videos. For example, if the display processing device 100 is a TV comprising a HDD or a memory, the recorded program storage module 160 stores, as content items, videos of recorded TV programs. Videos from digital versatile disks (DVDs) and videos captured by video cameras may be content items.

The recorded program storage module 160 stores metadata items, which concern content items, respectively associated with the content items. The "metadata item" means a group of information items indicating properties peculiar to a content item, and contains a title of the content item named by a creator of the content item, and broadcast date/time, etc. For example, if a content item is a TV program, a metadata item thereof is information including a title of the TV program, a channel, broadcast date/time, casts, content of the program, genre information (program information), and/or a representative image. The metadata item is supplied together with the content item and stored into the recorded program storage module 160.

The display 170 is a liquid crystal display (LCD) which displays text and images, and displays content items such as received TV programs, stored content items, electronic program guides, etc. The display 170 also displays display information items respectively representing substances of content items generated by a display information generator 105 which will be described later.

The broadcast receiver 108 receives video content items (TV programs) broadcasted by TV broadcast through an antenna or cable (not illustrated).

The video reproduction module 107 obtains a video content item which a user wishes to play back, i.e., a content item such as a TV program received by the broadcast receiver 108, a video content item obtained by the IPTV server 200 through the IPTV connection module 180, or a video content item stored in the recorded program storage module 160. The video reproduction module 107 decodes (plays back) the obtained content item and outputs the obtained content item to the display controller 106.

The video reproduction module 107 also outputs electronic program guides stored in the electronic program guide storage module 150 to the display controller 106.

The display controller 106 plays back and displays content items and electronic program guides which are output from the video reproduction module 107, on the display 170.

The remote control receiver 101 recognizes a press on an operation button by a user, the button being provided on the remote controller 90, and accepts the operation. For example, if a user searches for a particular content item from plural content items and further searches for a content item relevant to the particular content item, the user selects, by an operation button provided on the remote controller 90, a content item (key content item) as a center (key) for the search among plural content items displayed on an electronic program guide displayed on the display 170. Then, the remote control receiver 101 accepts the operation of selecting the key content item, i.e., an operation to search for a content item. Alternatively, a content key item being played back may be dealt with as a key content item. In this case, if the user presses an operation button provided on the remote controller 90 while playing back a content item, the remote control receiver 101 accepts the operation of dealing with the content item being played back, as a key content item, i.e., an operation to search a content item.

The display processing device 100 is connected to a user-created information management server 201. The user-creation information management server 201 stores information items created by an unspecified number of users (referred to as user-created information items). The user-created information is grapevine information such as an impression, an opinion, or a question about a content item. The user-created information item includes all text data about a content item that have been written into web pages on the Internet. The user-created information management server 201 is not comprised in the display processing device 100.

The display processing device 100 comprises a user-created information storage module 190 and a user-created information obtaining module 191. The user-created information obtaining module 191 obtains user-created information items from the user-created information management server 201. The user-created information storage module 190 stores user-created information items obtained by the user-created information obtaining module 191.

If the metadata obtaining module 103 accepts a selection operation for a key content item by the remote control receiver 101, the metadata obtaining module 103 obtains metadata items of all obtainable content items (i.e., a key content item and all other content items than the key content item). The obtainable content items are, for example, content items stored in the recorded program storage module 160, and content items which are to be obtained by the broadcast receiver 108 and the IPTV connection module 180 after the current time. The obtainable content items may be content items which can be obtained by the display processing device 100. Specifically, for example, the metadata obtaining module 103 obtains and manages metadata items of content items from the recorded program storage module 160. The metadata obtaining module 103 also requests metadata items of content items from the IPTV server 200, and obtains and manages the metadata items. Further, the metadata obtaining module 103 also obtains and manages metadata items of content items from electronic program guides stored in the electronic program guide storage module 150. Further, the metadata obtaining module 103 obtains user-created information items about content items stored in the user-created information storage module 190, and manages the user-created information items as metadata items.

If the metadata search module 102 accepts a selection operation for a key content item by the remote control receiver 101, the metadata search module 102 searches for a metadata item of the key content item from metadata items of content items obtained by the metadata obtaining module 103, and sends the searched metadata item of the key content item to the relevance calculator 104. Further, the metadata search module 102 searches for metadata items of other content items, as targets for which relevances to the obtained metadata item are to be calculated, from the metadata item of the key content item which has been obtained by the metadata obtaining module 103. The metadata search module 102 then sends the searched metadata items of the other content items to the relevance calculator 104.

If the metadata search module 102 accepts a selection operation for a key content item by the remote control receiver 101, the metadata search module 102 sends metadata items of all content items obtained by the metadata obtaining module 103 to the display information generator 105.

For each of attributes such as a title and a channel contained in each metadata item, the relevance calculator 104 calculates relevances of other content items to the key content item, based on metadata items of the selected key content item and other content items, which have been sent from the metadata search module 102. Specifically, a relevance RM is calculated by using the equation (1) given below. Each time when a key content item is selected, the relevance calculator 104 calculates relevances of the other content items to the key content item.

$$\text{Relevance } RM = \sum_{n=1}^{N} fa_n(M11(n), M21(n)) \times wa_n \qquad (1)$$

In the above equation (1), "N" is a total number of metadata items obtainable by the metadata obtaining module 103. "(n)" of a metadata item $M11(n)$ corresponding to the key content item and a metadata item $M21(n)$ corresponding to any other content item indicates that the metadata item is the n-th one of metadata items obtained by the metadata obtaining module 103. "$fa_n(M11(n),M21(n))$" is a function which returns, as $RM_n$, relevance of the metadata item $M21(n)$ to the metadata item $M11(n)$. "$Wa_n$" is a value indicating a weight (where n=1, ..., N).

Although information obtained as metadata items diverges variously as has been described above, a metadata item is supposed to be given N=5 which indicates an aggregate of five attributes (recorded date/time, a title of a content item, a channel thereof, a genre thereof, and a cast list thereof) in order to simplify descriptions below. Descriptions will be made supposing that these five metadata items are given n=1, 2, ..., 5 from the top.

Hence, the relevance RM of another content item to the key content item can be expressed as a linear sum of five relevances $RM_1$ to $RM_5$ as cited below.

$RM_1=fa_1$ (recorded date/time of metadata item M11, recorded date/time of metadata item M21)

$RM_2=fa_2$ (title of metadata item M11, title of metadata item M21)

$RM_3=fa_3$ (channel of metadata item M11, channel of metadata item M21)

$RM_4=fa_4$ (genre of metadata item M11, genre of metadata item M21)

$RM_5=fa_5$ (cast list of metadata item M11, cast list of metadata item M21)

For example, the closer the recorded date/time is, the greater the value of $fa_1$. The more distant the recorded date/time is, the smaller the value of $fa_1$. Specifically, for example, a relational expression of $MO1/|rec\_data(M11)-rec\_data(M21)|$ can be used. Here, $rec\_data(x)$ is a function of uniquely converting recorded date/time of x into an integer, and converting recorded date/time into seconds elapsed from certain reference date/time, supposing that the certain reference date/time is 0. MO1 is an arbitrary constant, and |X| is a function of expressing the size of X, which is typically an absolute value.

In the example cited above, g which satisfies a function of $g(x)=MO1/\|x\|$ is taken where $fa_1(M11,M21)=g(rec\_data(M11)1rec\_data(M21))$ is given. The embodiment is not limited to this example. The g may use a L2 norm which satisfies, for example, $g(x)=MO1/\|x\|$. In this case, $\|x\|$ is a square root of a sum of squares of differences between elements which constitute x.

Alternatively, g(x) may use a sigmoid function or a gamma function. In the above example, the closer to each other the metadata items M11 and M21 are, the greater the value is. The embodiment, however, is not limited to this example. Inversely, the embodiment may be configured to take a smaller value as the metadata items M11 and M21 are closer to each other. Also alternatively, a function g which takes a greater value under a particular condition may be used.

For example, $fa_2$ is realized by a function which takes a greater value as a number of common characters included in text strings of titles of the metadata items M11 and M21 increases. For example, if the metadata items M11 and M21 respectively contain titles "A B C D E" and "F G C D H", two characters "C D" are included in common in both titles. Alternatively, if "A B C D E" and "F G H I E" are titles, one character is included in common in both titles, and therefore, the former title results in a greater value than the latter title. Alternatively, if a relevance is determined by a keyword included in content of a program, the relevance can be calculated in the same manner as in the case of titles.

Although the above description cites an example of simple comparison depending on the number of common characters included in two metadata items, the embodiment is not limited to this example. For example, a greater value may be taken as the number of common characters from the top increases. Alternatively, a condition may be added to regard metadata items, which include similar concepts, to be common to each other even if common characters are not included. As an example of the latter case, "Yakyu(which means baseball in Japanese)" may be regarded to be similar to "baseball". If these words are respectively included in metadata items, the metadata items are considered to include a common text string.

If metadata items of content items include a common main text string to each other and also include respectively different subsidiary text strings, the content items often belong to one common series. In this case, $fa_2$ can take a much greater value. For example, "A B C D E #2" and "A B C D E #3" can be regarded to be different chapters in one common series of drama content items. In this case, the value of $fa_2$ may be doubled. The above descriptions cite mere examples, and higher level comparison than described above can be achieved by using a known technique such as a search depending on regular expressions.

For example, $fa_3$ is a function which takes a greater value if the metadata items M11 and M21 indicate the same channel as each other. Simply, $fa_3$ can be realized as a function which takes a value of MO2 in case of the same channel, or otherwise takes a value of 0. MO2 is an arbitrary constant. As a further enhanced alternative, the function may take any other value in case of the same channel in the same series. For example, in case of owned and operated stations, the function may return a value of MO2/2. Alternatively, in case of different media which belong to owned and operated stations, the function may return MO2/4. Configurations described above cite mere examples, and arbitrary functions can be used.

For example, $fa_4$ is a function which takes a greater value if the metadata items M11 and M21 indicate the same genre as each other. For example, the function takes a value of MO3 if both M11 and M21 indicate a genre "sport", or otherwise takes a value of 0. Further, if M21 indicates a sub-genre which belongs to a genre indicated by M11, e.g., if M11 and M21 respectively indicate genres "sport" and "baseball", the function may take a value of M03/2. If M11 and M21 do not directly indicate the same genre as each other and if M11 and M21 belong to the same parent genre, e.g., if M11 and M21 respectively indicate genres "baseball" and "soccer", both of M11 and M21 belong to the same genre "sport" as each other, and therefore, the function may take MO3/4. Configurations described above cite mere examples, and arbitrary functions can be used.

$fa_5$ is similar to $fa_4$. For example, $fa_5$ may be a function which takes 2×MO2 (where MO4 is an arbitrary constant) if metadata items M11 and M21 respectively include cast lists "WW, XX, YY" and "XX, YY, ZZ" which include two common casts. Otherwise, if no common cast is included, the function takes 0. Further, casts may include groups. For example, if a certain cast KK belongs to a group XX and if there are metadata items M11 and M21 respectively including "VV, MM, XX" and "KK, YY, ZZ", M11 indicates appearance of the group XX, i.e., appearance of KK as a member of the group XX, and M21 indicates no appearance of the group XX but appearance of KK as a member of the group XX. In this case, the function may return MO4/2.

Similarly, if a relationship concerning groups to appear and casts are specified, e.g., if groups XX and YY belong to the same office, the function may be enhanced to return MO4/4. In this case, a relationship between a group and casts or a relationship between casts and an office to which a group belongs may be configured to be defined in a metadata item or to be obtained from an external server (information site).

The above description cites examples in which relevances about casts listed on the cast list are not distinguished from each other. However, the embodiment is not limited to these examples. The embodiment may be further configured to perform weighting in accordance with an order of casts listed in the cast list. For example, if comparison is made with a cast listed first in the metadata item M11, a calculated relevance is maintained unchanged. For a cast listed second, a calculated relevance is weighted by ½. For a cast listed third, a calculated relevance is weighted by ⅓. Thus, weights may be varied in accordance with the order of casts listed in the metadata item M11. For example, if the cast listed second in the metadata item M11 is compared with the cast listed third in the metadata item M21, the relevance is weighted by ½ for the second cast in the metadata item M11, and is weighted by ⅓ for the third cast in the metadata item M21. Therefore, a total relevance is ½×⅓=⅙. Alternatively, weights for relevances for casts may be varied by using information concerning a main cast. For example, a calculated relevance may be weighted to be doubled for a main cast.

The display information generator 105 generates display information items expressing content of a key content item and other content items, from meta data items of the key content item and the other key content items, which have been sent from the metadata search module 102. Specifically, for example, based on a metadata item of a video data item whose content item is stored in the recorded program storage module 160, the display information generator 105 generates a display information item which makes a representative image displayable on the display 170, with a title added to the representative image. Alternatively, for example, based on a metadata item of a video data item whose content item is obtained from the IPTV server 200, the display information generator 105 generates a display information item which makes a representative image displayable on the display 170, with a title added to the representative image. Also alternatively, for example, based on an electronic program guide stored in the electronic program guide storage module 150, the display information generator 105 generates a display information item which makes a title of TV program, broadcast date/time, a channel, and content of the program displayable on the display 170. A display information item based on a metadata item specific to a content item is referred to as a content-attribute information item. Further, based on a user-created information item as a metadata item obtained from the user-created information management server 201, the display information generator 105 generates a display information item which makes impressions about the content item displayable on the display 170.

Details of the display information item will now be described. FIG. 2 illustrates an example of a content display information item representing content of a content item. FIG. 2 illustrates, for example, a key content-attribute information item C1 generated on the basis of a video data item stored in the recorded program storage module 160. As illustrated in this figure, the key content-attribute information item C1 is to show a representative image of content item thereof at C1-1 as well as a title "L358Δ*6" of the content item (video) thereof at C1-2.

Meanwhile, if the display controller 106 accepts an operation of searching for a content item from a user, the display controller 106 performs a control of displaying a list information item (a similar content list) on the display 170, where the list information item lists and displays a key content display information item and other content display information items relevant to the key content item, on the display 170.

Figure 3:
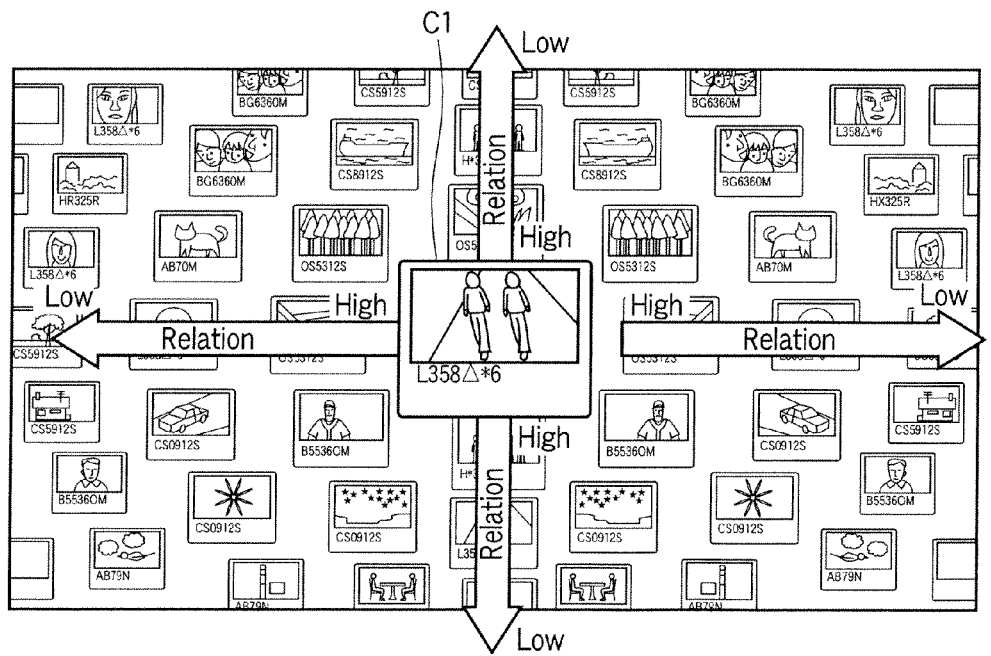
FIG. 3 is an exemplary screen view illustrating an example of display positions of content-attribute information items.

FIG. 3 is a display screen view for describing display positions of content display information items. Described here is an example which uses the content-attribute information item illustrated in FIG. 2 with respect to content display information items in a similar content list. For example, a user selects a content item (key content item) to become a center (key) for a search, from plural content items displayed in the electronic program guide 300 displayed on the display 170, by using an operation button provided on the remote controller 90. Then, the remote control receiver 101 accepts an operation of searching for a content item.

As illustrated in FIG. 3, the user selects display of a similar content list in which content-attribute information items are arranged, by an operation button provided on the remote controller 90. Then, the display 170 displays a similar content list listing and displaying a key content-attribute information item and other content-attribute information items relevant to the key content item.

In the similar content list, the key content-attribute information item is located at a particular position, and the other content-attribute information items are located at positions on edges or vertices of plural polygons formed coaxially about a center which is the position of the key content-attribute information item. Further, in the similar content list, the other content-attribute information items are located in a layout depending on operational directions of an operation button provided on the remote controller 90, such as a cross key. Also, the other content-attribute information items are located, in an order from the highest relevance, from vicinity of the center within predetermined regions divided respectively for attributes in radial directions from the center. Also, the similar content list displays the key content-attribute information item at a maximum size, and displays the other content-attribute information items, sizes of which decrease with increase in distance from the vicinity of the center.

The display controller 106 locates the key content-attribute information item C1 at a particular position, and sets four axes (axes 1 to 4), i.e., positive and negative X-axis directions, and positive and negative Y-axis directions about the key content-attribute information item C1 as a center. The display controller 106 assigns, to the axes, attributes included in the metadata item of the selected key content item.

For example, "title" of a TV program (content item), "person" indicating casts, "keyword" for performing a search included in content of the program, and "genre" of the TV program are allotted to the attributes included in each metadata item. The attributes assigned to the axes can be used as indices when the user searches for other content items relevant to a key content item. Other attributes may be creation time of a content item and a provider thereof.

Layout directions of the axes may be switched by a selection operation of a user. Specifically, a menu for selecting a layout of axes may be provided on the remote controller 90. For example, in a scheme of display in a polygonal layout, the user is allowed to reassign the "person" axis which is assigned to the negative Y-direction on the menu screen. Further, by operating the remote controller 90, a menu for selecting a layout position of an attribute which the user is going to display as an axis is displayed on the display 170 by the display controller 106. A layout position of an axis is selected from the selection menu. A change to the layout position of the axis is made by a button also provided on the remote controller 90. In this manner, the user can freely relocate axial directions to positions where the user can easily see the axial directions.

As illustrated in FIG. 4, the display controller 106 generates predetermined regions (regions 1 to 4) respectively including the axes, by dividing a region in radial directions from the key content-attribute information item C1 as the center, by arbitrary angles which respectively include the axes representing attributes. For example, the arbitrary angles each are 90 degrees including one axis. Accordingly, the predetermined regions (regions 1 to 4) including the plural axes (axes 1 to 4) are presentation ranges indicating display information items located in association with the corresponding ones of the plural attributes relating to calculation of relevances. The display controller 106 may display the plural axes together with the plural attributes when displaying the similar content list on the display 170.

At this time, as illustrated in FIG. 3, the display controller 106 locates other content display information items in the order from the highest relevance to the key content item toward outside from vicinity of the center where the key content-attribute information item C1 is located.

The display controller 106 thus generates the similar content list in which the key content-attribute information item C1 and the other content-attribute information items are located, and displays the generated similar content list on the display 170. The display controller 106 prestores located positions and display sizes of the key content-attribute information item and the other content-attribute information items. After calculating relevances to the key content item, the display controller 106 orderly locates the other content-attribute information items in a predetermined display size.

In the similar content list, the other content-attribute information items are arranged outwardly from the vicinity of the center where the key content-attribute information item C1 is located, to be associated with attributes "title", "person", "keyword", and "genre" respectively in the upper, right, lower, and left sides.

In this manner, according to a display scheme of locating relevant content items about a key content item as a center under concept of axes corresponding to indices for relevances, which axis a content item belongs to can be understood at a glance.

Thus, the similar content list is displayed in which other content-attribute information items are located at positions on edges or vertices of plural polygons formed coaxially about a center which is the position of a key content-attribute information item, in a layout depending on operational directions of the operation button provided on the remote controller 90, in an order of the highest relevance from the vicinity of the center. In this manner, the user can easily search for content items relevant to a key content item from among a huge number of content items by an operation through the remote controller 90.

The display controller 106 comprises a scroll module 109 and has functions as follows. If an operation button on the remote controller 90 is pressed and the remote control receiver 101 accepts a specify operation for specifying a target content-attribute information item of a targeted content item, the scroll module 109 moves the similar content list in the direction of the specify operation within a predetermined display range. At this time, the display controller 106 maintains the key content-attribute information item displayed within the display range, regardless of a distance by which the similar content list is scrolled to move by the scroll module 109. Also, the display controller 106 displays one other content-attribute information item which has become a target content item specified by operating the operation button, in a manner that the display size of the one other content-attribute information item is larger than that of the remaining other content-attribute information items which are not specified.

FIG. 5 illustrates display positions when user-created information items are displayed as content display information items. Calculation of relevances of other content items to a key content item and display of content display information items in the similar content list are the same as described above.

As illustrated in FIG. 5, if the user selects display of the similar content list in which user-created information items are located, by using an operation button provided on the remote controller 90, the display 170 then displays the similar content list which lists up a user-created information item of a key content item and user-created information items of other content items relevant to the key content item.

Like when content-attribute information items are displayed as content display information items as illustrated in FIG. 3, the display 170 need not change attributes of the axes when user-created information items are displayed as content display information items, as illustrated in FIG. 5. That is, the display 170 sets "person" for the positive X-direction, "genre" for the negative X-direction, "title" for the positive Y-direction, and "keyword" for the negative Y-direction. Like when content items are displayed at positions depending on their own relevances on the axes, the display 170 displays user-created information items corresponding to content items, at display positions of the content items, respectively.

FIG. 5 illustrates a display example of user-created information items when the user selects a particular drama as a key content item. The display 170 displays, at the center, a user-created information item corresponding to the key content item. An impression about the particular drama, which has been created by a user, is displayed in a display region of the key content item. User-created information items of the other content items are displayed in corresponding display regions of the other content items, arranged in an order from the highest relevance along axes of "person", "title", "genre", and "keyword". The display regions for user-created information items of the key content item and the other content items are display positions of the content display information items illustrated in FIG. 3, and are the same as the display regions thereof.

As has been described with reference to FIGS. 3 and 5, the display processing device 100 is provided with at least two display modes for the similar content list, i.e., a mode of displaying content-attribute information items as content display information items and a mode of displaying user-created information items as content display information items. The display controller 106 may display the similar content list by switching the modes in accordance with selection made by the user or may switch the modes each time a constant time period elapses. According to the embodiment, the display 170 can display the list, switching the two modes, and can therefore improve convenience for the user.

Figure 6:
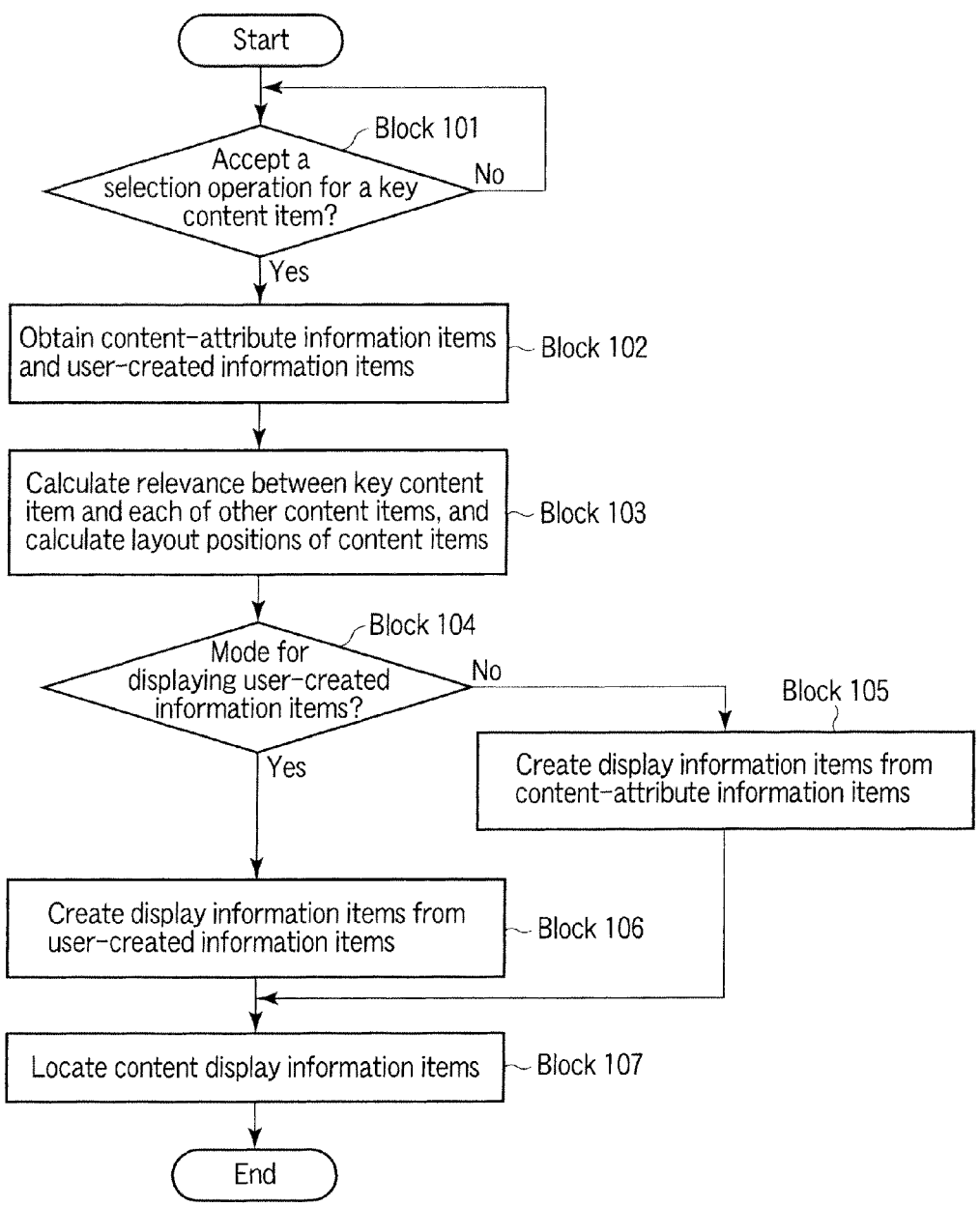
FIG. 6 is an exemplary flowchart which describes details of a display operation for display information items.

Next, a display processing for content display information items by the display processing device 100 will now be described. FIG. 6 is a flowchart representing a flow of the display processing for content display information items by the display processing device 100.

At first, the remote control receiver 101 waits for acceptance of a selection operation for a key content item from an operation button on the remote controller 90 (Block 101). If a selection operation is accepted (Block 101, YES), the metadata obtaining module 103 obtains metadata items of the key content item and other content items, and the display information generator 105 generates content-attribute information items and user-created information items (Block 102).

Next, the relevance calculator 104 calculates relevances of the other content items to the key content item, based on the metadata items. Further, based on the relevances calculated by the relevance calculator 104, the display controller 106 calculates display positions of the key content item and the other content items (Block 103).

The display controller 106 determines whether the mode of displaying user-created information items as content display information items is selected by the user or not (Block 104). If the mode of displaying user-created information items is selected (Block 104, YES), the display controller 106 creates a similar content list on the basis of user-created information items (Block 105). Then, the display controller 106 displays the user-created information items at specified display positions, as illustrated in FIG. 5 (Block 106).

If the mode of displaying user-created information items is not selected, i.e., if the mode of displaying content-attribute information items is selected instead (Block 104, NO), the display controller 106 creates a similar content list on the basis of content-attribute information items (Block 107). Then, the display controller 106 displays content-attribute information items respectively at specified display positions, as illustrated in FIG. 3 (Block 106).

Figure 7:
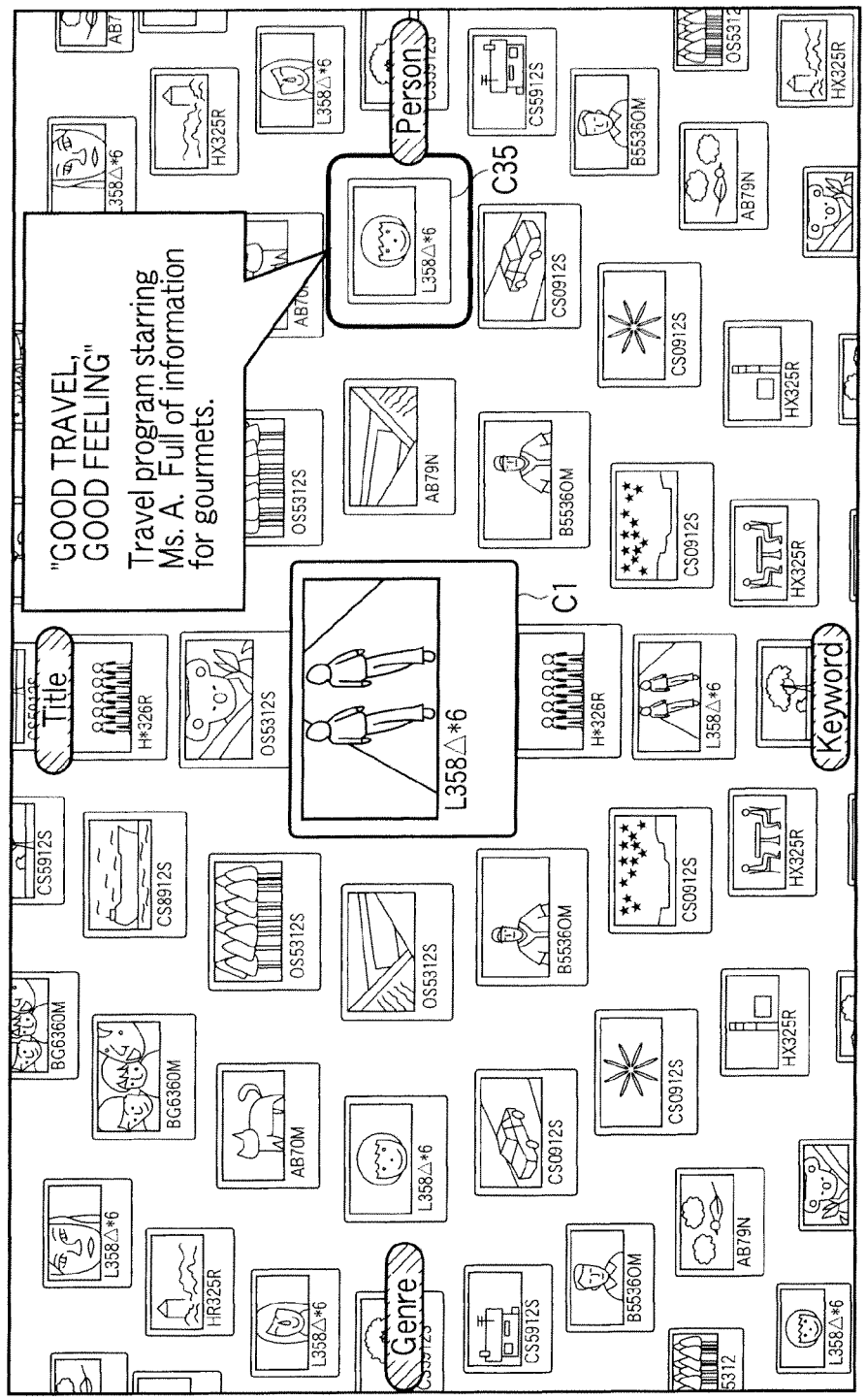
FIG. 7 is an exemplary display screen illustrating another display example of content display information items.

FIG. 7 illustrates another display example of content display information items. FIG. 7 is a display screen view illustrating a state that a user selects, by an operation button, an arbitrary content item on the remote controller 90, on the display screen of the similar content list in which content-attribute information items are located, as illustrated in FIG. 3. The user moves a cursor rightwards, i.e., in a direction in which a relevance of "person" to the key content item and decreases, by the operation button on the remote controller 90. The cursor is positioned at a content-attribute information item C35.

The display controller 106 displays a user-created information item corresponding only to the content-attribute information item C35 where the cursor is positioned. The display controller 106 displays the user-created information item overlapped over the similar content list in a manner that the user-created information item, for example, balloons up from the display position of the content-attribute information item C35. The display controller 106 does not display any user-created information item for the other content-attribute information items than the content-attribute information item C35. In place of the user-created information item, the display controller 106 may display an enlarged content-attribute information item added with more detailed information than the content-attribute information item displayed on the similar content list, in response to an operation on the remote controller 90 by the user. The more detailed information may include, for example, a title and/or content of a program obtained from an electronic program guide.

In the display example illustrated in FIG. 7, excess of information does not occur beyond the display screen of the display 170. The user can visually check a user-created information item or a detailed content-attribute information item with respect to only a selected content item. Therefore, the user can easily select a particular content item from among plural content items.

FIG. 8 illustrates another display example of content display information items. FIG. 8 is a display screen view of user-created information items which are displayed when a user selects, by an operation button on the remote controller 90, an arbitrary content item on the display screen of the similar content list in which content-attribute information items are located, as illustrated in FIG. 3. Here, the user selects a content display information item C35 of a program 1.

The display controller 106 displays all user-created information items corresponding to the content-attribute information item C35 of the program 1 over the whole screen of the display 170. The display controller 106 may display the user-created information items either in descending order of dates or prioritizing user-created information items including a keyword used as a source of relevance calculation. The user may select a particular user-created information item from a user-created information list by using the remote controller 90. If the display 170 cannot display all user-created information items corresponding to the content-attribute information item C35 of the program 1 within one screen, the display controller 106 scrolls and displays the user-created information list in response to an operation on the remote controller 90 by the user.

The keyword as a source of relevance calculation is, for example, a personal name (such as Ms. A in the example of FIG. 8) which is included in common in both metadata items of the key content-attribute information item C1 and the content-attribute information item C35 of the program 1. If the personal name (Ms. A) is a source of relevance calculation, the display controller 106 displays user-created information items in a manner that user-created information items including the personal name (Ms. A) are prioritized more highly. The display controller 106 may display the personal name (Ms. A) highlighted in user-created information items.

In the display example in FIG. 8, the user can obtain plural user-created information items about a selected content item. Since the user can understand comments about the selected content item at a glance, the user can easily select a particular content item from the plural content items.

Figure 9:
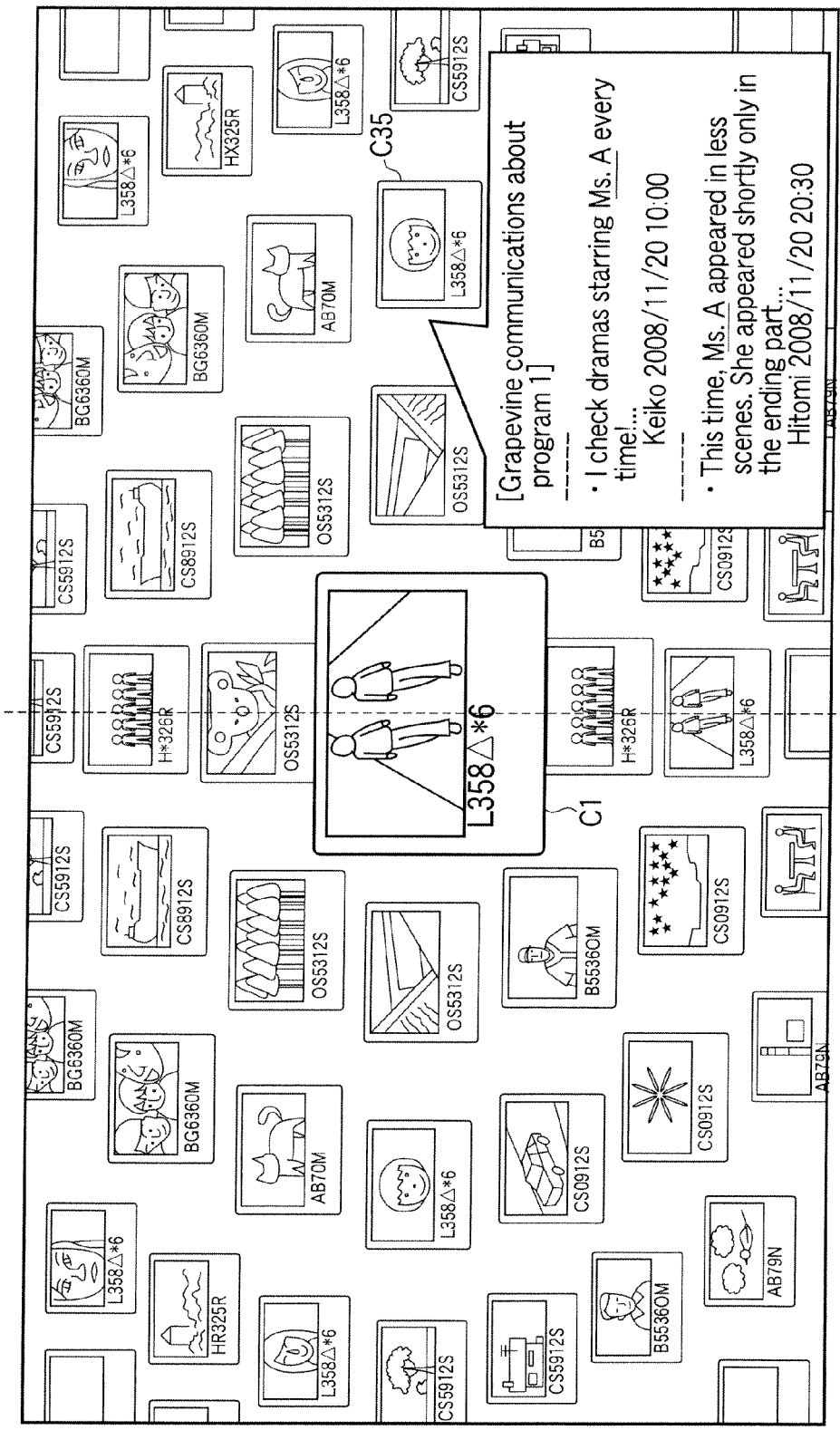
FIG. 9 is an exemplary display screen illustrating another display example of content display information items.

FIG. 9 illustrates another display example of content display information items. FIG. 9 is a display screen view of user-created information items which are displayed when the user selects, by an operation button on the remote controller 90, an arbitrary content item on the display screen of the similar content list in which content-attribute information items are located, as illustrated in FIG. 3. Here, the user selects a content display information item C35 of a program 1.

The display controller 106 displays only user-created information items which include a keyword as a source of relevance calculation, as has been described above. The display controller 106 displays the user-created information items overlapped over the display screen in a manner that the user-created information items, for example, balloon up from the display position of the content-attribute information item C35. A display region of user-created information items is smaller compared with the entire display screen of the display 170.

In the display example in FIG. 9, even if there are a large number of user-created information items on the display screen of the display 170 having a limited size, the display region for displaying user-created information items can be avoided from increasing. Further, since only material user-created information items are displayed, excess of information does not occur but the user can obtain material user-created information items.

The display controller 106 may display user-created information items including a keyword as a source of relevance calculation, so as to be prioritized more than user-created information items including no keyword. For example, prioritized display is to display user-created information items including a keyword, prioritized more highly than user-created information items including no keyword, or to display a keyword in user-created information items including the keyword.

FIG. 10 illustrates another display example of content display information items. FIG. 10 is a display screen view of user-created information items which are displayed when the user selects, by an operation button an arbitrary content item on the remote controller 90, as illustrated in FIG. 3. Here, the user selects a content display information item C35 of a program 1.

The display controller 106 displays user-created information items corresponding only to a content-attribute information item C35 where a cursor is positioned. The display controller 106 displays a similar content list and a user-created information list independently from each other, respectively in a display region for the similar content list in which content-attribute information items are located and in a display region for the user-created information list corresponding to the content-attribute information item C35. The display controller 106 may display the display region for the user-created information list corresponding to the content-attribute information item C35, overlapped on a part of the display region for the similar content list displayed on the display screen of the display 170. In FIG. 10, the display controller 106 displays the user-created information list in the right side of the display screen of the display 170.

In the display example in FIG. 10, excess of information does not occur beyond the display screen of the display 170. In the display 170, the similar content list about a key content-attribute information item as a center, and the user-created information list are displayed independently from each other. Information items can be displayed put in order. The user can easily obtain an information item from the user-created information list, and therefore can easily select a particular content item from plural content items.

According to the embodiment, a similar content list is displayed in which other content-attribute information items are arranged from a position of a key content-attribute information item, in an order from the highest relevance. In this manner, a group of content items having different relevances to the key content item with respect to each of different indices (attributes) are displayed at once. Further, display is performed in a manner that differences in relevance to the key content item are understood from relevance attribute information items (wherein differences in relevance are, for example, a person-related group which is calculated by an index of relevance indicating the same cast, and a title-related group which is calculated by an index of relevance indicating similar titles). Therefore, the user can see differences between indices of relevances, with the differences divided into groups. Unlike a schema of displaying groups on grids, distances between a key content and individuals of relevant content items are given meanings (such as relevances/time differences). Accordingly, a mechanism can be constructed with an ability to easily search for content items relevant to a key content item searched for from various diversified content items.

Further, the embodiment principally has features as follows. The first feature is that a user can obtain a corresponding user-created information item, based on an arbitrary content item. The second feature is that a user can obtain user-created information items relevant to a user-created information item by using relevances between displayed content items. The third feature is that a user can obtain a corresponding content item, based on a user-created information item.

The first feature described above allows a user to know what impression another user has about an arbitrary content item. The second feature described above allows a user to obtain information searched for and worthy information as the user-created information items are arranged and displayed corresponding to relevances to the key content item. For example, when a user wishes to know what impression another user has about a certain cast, the user need only see user-created information items along the axis of "person" from a key content item. The user can easily find relevant content items with respect to relevances based on user-created information items. That is, the user can know as much information as possible about a particular cast. The third feature allows a user to obtain a corresponding content item, based on an interested user-created information item. Through user-created information items, the user can find content items which otherwise could have not been found only through relevances between content items.

The processing executed by the display processing device 100 according to the embodiment may be realized and provided as a program in form of a file in an installable or executable format, with the program recorded on a computer-readable recording medium, such as CD-ROM, a flexible disk (FD), CD-R, or DVD.

The program executed by the display processing device 100 according to the embodiment may be configured to be stored in a computer connected to a network such as the Internet, and provided by downloading through the network. Alternatively, the program executed by the display processing device 100 according to the embodiment may be provided or distributed through a network such as the Internet.

Further, the embodiment is applicable to the display processing device 100 even if at least the display 170 is removed from the display processing device 100. Further, the embodiment is also applicable to the display processing device 100 which functions as a server (a display information distribution device). That is, the display processing device 100 which functions as a server outputs information of a display screen of a similar content list constituted by content display information items and/or user-created information items. In this case, the remote control receiver 101 functions as a module which accepts a selection operation for selecting a key content item by the user, from a terminal connected through the network. Further, the display controller 106 functions also as a distribution module which distributes information of a display screen to a terminal connected through the network.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising:
a receiver configured to receive an operation for selecting a key content to become a search key from a plurality of contents;
a processor configured to obtain user-created information comprising grapevine comments which are electronically written into web pages, the grapevine comments comprising first comment corresponding to the key content or second comments corresponding to the other contents; and
a display controller configured to display, if the grapevine comments comprise the second comments and when the operation for selecting the key content is received by the receiver, images corresponding to the other contents, one of the displayed images being associated with a text corresponding one of the second comments, wherein
the first comment and the second comments are arranged according to degrees of relevance between the key content and each of the other contents, the degrees of relevance determined based on both meta data of the key content and each of meta data of the other contents, and
one of the key content and each of the other contents can be obtained by using the user-created information comprising the grapevine comments.

2. The apparatus of claim 1, wherein the display controller controls in a manner that comment, which corresponds to a keyword as a source for calculation of the degrees of relevance is displayed, prioritized among the other comments.

3. The apparatus of claim 1, wherein the display controller is configured to control arrangement of the second comments in order from highest relevance in radial directions, from the first comment display position.

4. A display processing method comprising:
receiving an operation for selecting a key content to become a search key from a plurality of contents, by an operation receiver;
obtaining user-created information comprising grapevine comments which are electronically written into web pages the grapevine comments comprising first comment corresponding to the key content or second comments corresponding to the other contents; and
displaying, if the grapevine comments comprise the second comments and when the operation for selecting the key content is received by the receiver, images corresponding to the other contents, one of the displayed images being associated with a text corresponding one of the second comments, the first comment and the second comments arranged according to degrees of relevance between the key content and each of the other contents, the degrees of relevance determined based on both meta data of the key content and each of meta data of the other contents, and
obtaining one of the key content and each of the other contents by using the user-created information comprising the grapevine comments.

5. The method of claim 2, further comprising:
controlling in a manner that comment, which corresponds to a keyword as a source for calculation of the degrees of relevance, is displayed, prioritized among the other comments.

6. A display processing device comprising:
a processor;
an operation receiver configured to receive an operation for selecting a key content item;
an obtaining module configured to obtain user-created information comprising grapevine information items which are opinions being data written into web pages, the opinions or impressions being related to each of the key content item and other content items; and
a display controller configured to control to display a list information item in which the grapevine information items related to the other content items are arranged according to relevance between the key content item and each of the other content items, wherein a part of the grapevine information items is shown in a sub-screen generated near a position of a particular one of the other content items, the particular one being selected by a user's operation.

7. A display processing method comprising:
receiving an operation for selecting a key content item, by an operation receiver;
obtaining user-created comprising grapevine information items which are opinions or impressions written into web pages, the opinions or impressions being related to each of the key content item and other content items, and
controlling to display a list information item in which the grapevine information items related to the other content items are arranged according to relevance between the key content item and each of the other content items, wherein a part of the grapevine information items is shown in a sub-screen generated near a position of a particular one of the other content items, the particular one being selected by a user's operation.

8. A display processing method comprising:
receiving an operation for selecting a key content to become a search key from a plurality of contents, by a receiver;
obtaining user-created information comprising grapevine comments which are electronically written into web pages the grapevine comments comprising first comment corresponding to the key content or second comments corresponding to the other contents; and
controlling to display, if the grapevine comments comprise the second comments and when the operation for selecting the key content is received by the receiver, images corresponding to the other contents, the first comment and the second comments arranged according to degrees of relevance between the key content and each of the other contents, the degrees of relevance determined based on both meta data of the key content and each of meta data of the other contents, by a display controller, and obtaining one of the key content and each of the other contents by using the user-created information comprising the grapevine comments, wherein a part of the grapevine comments is shown in a sub-screen generated near a position of a particular one of the other content items, the particular one being selected by a user's operation.

9. The method of claim 8, wherein the controlling is arrangement of the second comments in order from highest relevance in radial directions, from the first comment display position.

10. A non-transitory computer-readable storage medium storing computer-executable instructions that, when executed, cause a computer to:

receive an operation for selecting a key content to become a search key from a plurality of contents;

obtain user-created information comprising grapevine comments which are electronically written into web pages the grapevine comments comprising first comment corresponding to the key content or second comments corresponding to the other contents; and control to display, if the grapevine comments comprise the second comments and when the operation for selecting the key content is received by the receiver, images corresponding to the other contents, the first comment and the second comments arranged according to degrees of relevance between the key content and each of the other contents, the degrees of relevance determined based on both meta data of the key content and each of meta data of the other contents, and obtain one of the key content and each of the other contents by using the user-created information comprising the grapevine comments, wherein a part of the grapevine comments can be shown in a sub-screen generated near a position of a particular one of the other content items, the particular one being selected by a user's operation.

* * * * *